United States Patent [19]

Chen et al.

[11] 4,137,524
[45] Jan. 30, 1979

[54] REVERSIBLE PRINTING DISPLAY

[75] Inventors: Schoen-nan Chen, North Brunswick; Kenneth J. Harrison, Plainsboro, both of N.J.

[73] Assignee: Optel Corporation, Princeton, N.J.

[21] Appl. No.: 837,070

[22] Filed: Sep. 28, 1977

[51] Int. Cl.² .............................................. G02F 1/13
[52] U.S. Cl. ................................ 340/765; 340/378.2; 340/763; 340/785; 350/332; 350/335; 350/336; 340/759
[58] Field of Search ............................ 340/324 R, 336; 350/332, 335, 336, 350

[56] References Cited

U.S. PATENT DOCUMENTS

| | | | |
|---|---|---|---|
| 3,167,607 | 1/1965 | Marks et al. | 350/150 |
| 3,622,224 | 11/1971 | Wysocki et al. | 350/335 |
| 3,647,280 | 3/1972 | Klein et al. | 350/336 |
| 3,960,751 | 6/1976 | Moriyama et al. | 350/350 X |
| 4,037,927 | 7/1977 | Krueger | 350/336 |

*Primary Examiner*—David L. Trafton
*Attorney, Agent, or Firm*—Morris Liss; Israel Gopstein

[57] ABSTRACT

The present invention includes a multi-electrode structure including a counterelectrode, a display electrode in registry with the counterelectrode and finally an intermediately positioned apertured background electrode. Display material is contained between the counterelectrode and the background electrode. Depending upon the electric field conditions existing between the various electrodes, a display image may be created with a first dark-light contrast relationship relative to a background. An appropriate driving circuit is capable of changing the field relationship between the electrodes so that a reverse contrast relationship appears between a displayed image and its background.

7 Claims, 6 Drawing Figures

REVERSIBLE PRINTING DISPLAY

FIELD OF THE INVENTION

The present invention relates to liquid crystal displays and more particularly, to an A.C. driving circuit for such a display.

BRIEF DESCRIPTION OF THE PRIOR ART

It is known that the alignment of an electric field of certain host compounds, such as nematic liquid crystals, can be used to orient guest molecules dissolved in the host. This field-response orientation results in controlled changes in the absorption spectrum of the guest material. In this way electrically controlled devices suitable, for example, for display purposes can be constructed. (For a description of a typical such device see "Guest-Host Interactions in Nematic Liquid Crystals: A New Electro-Optic Effect," by G. H. Heilmeier, *Applied Physics Letters*, Aug. 1, 1968, pages 91–92, and G. H. Heilmeier U.S. Pat. No. 3,551,026, issued Dec. 29, 1970.)

Display devices of the guest-host type as heretofore constructed include auxiliary polarizers. In the so-called dark state of such a prior art device, the auxiliary polarizer aborbs all but one polarization of incident light and the host material dissolved in the liquid crystal material absorbs the remaining polarization. To achieve the bright state of such a device, the host molecules, and thereby the guest molecules also, are oriented by an electric field to assume their nonabsorbing state. But, even in this latter state, the auxiliary polarizer absorbs more than half of the incident light. As a result, the brightness characteristic of such known guest-host devices leaves much to be desired.

The prior art includes U.S. Pat. No. 3,833,287 to Taylor et al., issued Sept. 3, 1974. This patent discloses an embodiment in which an optically active dye material is added to a nematic liquid crystal material to impart to the mixture a helical molecular structure. The molecules of a pleochroic material dissolved in the host mixture are also ordered by this helical configuration thereby forming a cooperatively aligned guest-host system. In turn, the helical molecular ordering gives rise to an elliptical dichroism in the guest-host material for light propagation parallel to the helical axis.

In the absence of an applied electric field, the guest-host material inherently propagates incident upolarized light in two normal modes which are right- and left-handed elliptically polarized. The orientation of the electric vectors representative of these modes is such with respect to the longitudinal axes of the guest molecules that approximately 95 percent of the incident light is absorbed by the guest material without the use of an auxiliary polarizer. Consequently, the guest-host material assumes a relatively dark state.

In response to the application of an electric field to the device, the helical ordering of the guest-host material is unwound to produce a homeotropic molecular orientation. In this second-mentioned orientation relatively little of the incident light is absorbed by the guest molecules, and accordingly, the guest-host material appears relatively bright.

A feature of the Taylor patent is that in the absence of an applied electric field, a thin film of a guest-host material formulated to exhibit a helical molecular ordering which inherently, without the use of an auxiliary polarizer, absorbs incident unpolarized light to produce a relatively dark display. Moreover, it is a feature of the Taylor patent that an electric field is effective to convert the molecular ordering of the guest-host film to the homeotropic mode in which very little of the incident light is absorbed, thereby producing a relatively bright display.

It is characteristic of the guest dye that it absorbs light preferentially: its optical absorption spectrum is a strong function of the polarization of the incident light with respect to the orientation of the dye molecules. Specifically, when the electric vector representative of light polarization is parallel to the longitudinal axis of such a dye molecule, the molecule is relatively absorptive of that portion of the incident light whose wavelengths fall within a prescribed range. As a result of this absorption, the dye molecules dispersed in a guest-host film exhibit a characteristic color. The device is then said to be in its dark state. On the other hand, when the electric vector of the incident light is perpendicular to the longitudinal axis of such a dye molecule, the molecule appears relatively transparent. Accordingly, under that set of circumstances, the film or some preselected localized portion thereof assumes a relatively clear or bright state.

The absorption phenomenon characteristic of the present invention can be better understood by considering FIGS. 1 and 2, which schematically depict the conductive coatings 13 and 15 bounding the thin film 16 that comprises the aforedescribed dye-liquid crystal mixture. In each of FIGS. 1 and 2 input (ambient unpolarized) light is represented by a dash-line vector 25 directed at the coating 13.

In FIG. 1 no voltage is assumed to be applied between the coatings or electrodes 13 and 15. Accordingly, no applied electric field is present through the film 16. In this condition the molecules of the liquid crystal mixture, and therefore the molecules of the dissolved dye, assume a helical ordering. Since it is primarily the dye molecules that exhibit the selective absorption characteristic described herein, a representative helix of rod-like dye molecules $30a$ through $30l$, having a helical axis 35, is shown in FIG. 1 for illustrative purposes.

It is characteristic of a helically ordered dye-liquid crystal film 16 of the type described herein that, in the absence of an applied electric field, unpolarized light propagates therethrough in two elliptical modes. These modes, which are designated right- and left-handed helically polarized modes, are represented in vector form in FIG. 1. Thus, input light transmitted through the transparent coating 13 propagates through the film 16 in two modes that are represented by two sets of crossed vectors $40a$ through $40l$ and $42a$ through $42l$, respectively.

In FIG. 1 the longer vector of each pair of vectors $40a$ through $40l$ maintains a tracking parallel relationship with the dye molecules $30a$ through $30l$, respectively, as the light propagates through the film 16 in the z direction. As a result, almost all of the energy contained in that mode is absorbed by the dye molecules.

In FIG. 1 the shorter vector of each pair of vectors $42a$ through $42l$ maintains a parallel relationship with the dye molecules $30a$ through $30l$, respectively, so that portion of the light represented by the other elliptical mode propagates through the film 16. As a result of this interaction, much of the energy stored in this other mode is depleted during transversal of the film 16.

In practice it has been observed that, in the no-field case represented in FIG. 1, only about 5 to 10 percent of the input light directed through the transparent coating 13 is transmitted through the transparent coating 15 of the device 10 to appear as output light (vector 45).

In the FIG. 2 depiction a voltage is assumed to be applied between the conductive coatings 13 and 15. When the applied voltage reaches a point at which the corresponding field in the film 16 reaches a so-called transition value, the aforementioned helical molecular ordering is in effect unwound to establish a homeotropic molecular ordering, as represented in FIG. 2.

When the molecular ordering is as shown in FiG. 2, it is characteristic of the film 16 included in the device that the film propagates light in linearly polarized modes. Over most of the thickness of film 16 electric vectors 50 and 52 representative of such modes are perpendicular to the longitudinal axes of dye molecules 54a through 54l. Hence, relatively little of the propagating light is absorbed in the film during transit therethrough. In practice it has been observed that about 55 to 60 percent of the incident light is transmitted through the device 10 when the dye molecules in the film 16 are ordered as shown in FIG. 2.

An important factor for achieving high contrast ratio and brightness in a device of the type described is that the transition moment vector of the pleochroic guest have an orientation with respect to the crystallographic axis of the liquid crystalline host that is most nearly parallel thereto. Ideally the transition moment axis of the dye molecule should be most nearly parallel to its long molecular axis. The order of the dye relative to that of the liquid crystal optic axis depends on the order of the liquid crystal host molecules and the nature of the dye molecules. By selection of appropriate dye molecules, the ordering of the dye molecules may be greater than that of the host molecules.

BRIEF DESCRIPTION OF THE PRESENT INVENTION

The present invention includes a multi-electrode structure including a counterelectrode, a display electrode in registry with the counterelectrode and finally an intermediately positioned apertured background electrode. A layered material exhibiting visible contrast between adjacent portions, in response to an electric field, is contained between the counterelectrode and the background electrode. Depending upon the electric field conditions existing between the various electrodes, a display image may be created with a first dark-light contrast relationship relative to a background. An appropriate driving circuit is capable of changing the field relationship between the electrodes so that a reverse contrast relationship appears between a displayed image and its background. The multiple electrode structure of the present invention is unique and eliminates the appearance of unsightly electrode leads that would ordinarily appear if reverse contrast (printing) conditions were attempted with conventional liquid crystal displays. Further, by virtue of the present invention, there is no "dead zone" which would ordinarily create a contrasting border around a display image if reverse printing were attempted with conventional displays.

An advantage of the present invention is the utilization of reverse printing modes for different data functions. Thus, for example, in a digital watch, a first printing mode may be employed for time while a reverse printing mode is utilized to display data information.

The present invention has application to several conventional displays for reverse printing. These include liquid crystal and electrochromic displays. It is suspected that gas discharge, electrophoretic displays as well as others will operate.

BRIEF DESCRIPTION OF THE FIGURES

The above-mentioned objects and advantages of the present invention will be more clearly understood when considered in conjunction with the accompanying drawings, in which.

DETAILED DESCRIPTION OF THE INVENTION

Figure 2:
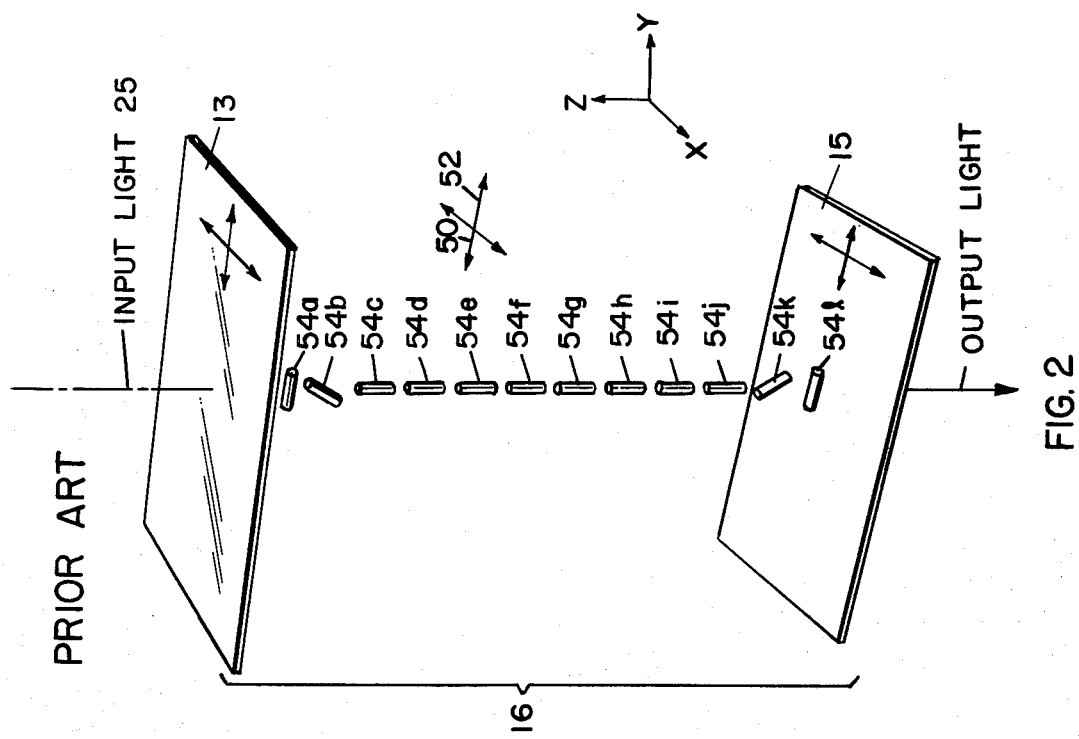
FIGS. 1 and 2 depict the molecular orderings and corresponding light propagation modes that exist in a liquid crystal film display of the prior art, in the absence and presence, respectively, of an applied electric field.
Figure 1:
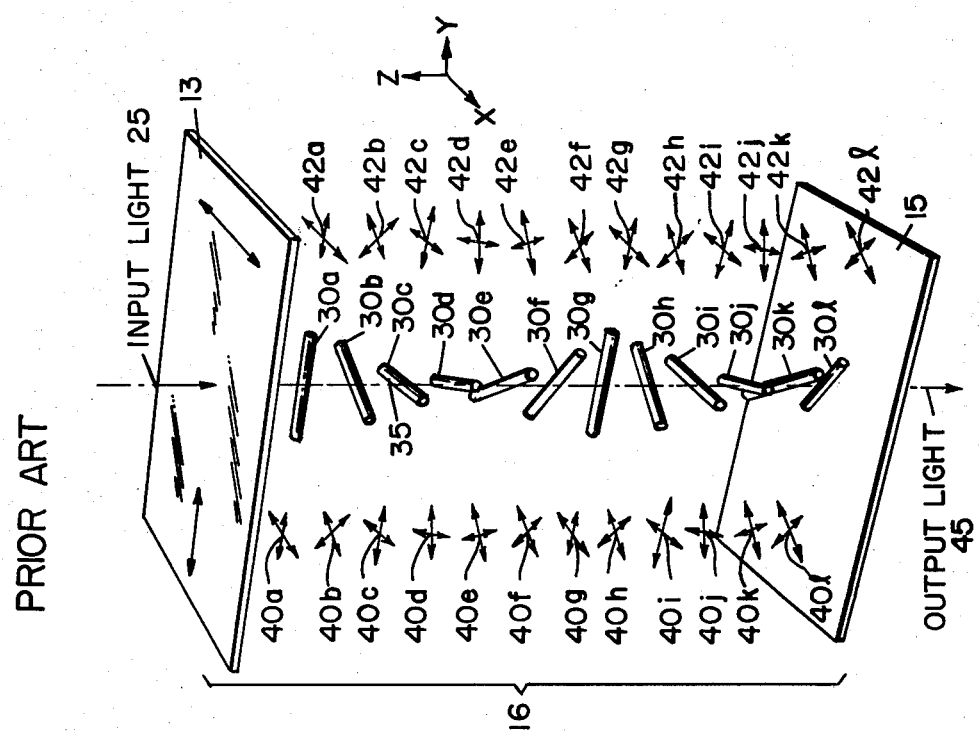
Figure 3:
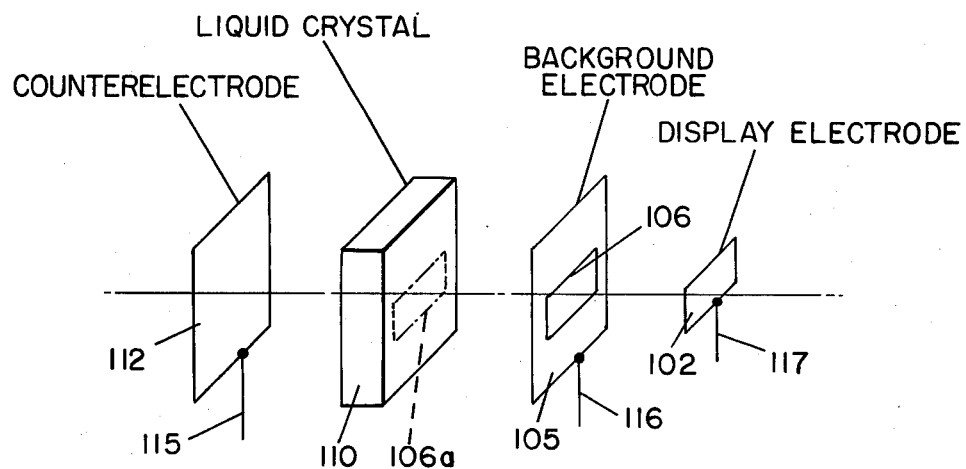
FIG. 3 is a diagrammatic representation of a basic display structure which constitutes the present invention.

Referring to the figures and more particularly FIG. 3 thereof, a basic structure for the present invention is illustrated for a typical display material, namely, liquid crystal. A display electrode 102 has a lead 117 attached thereto. The display electrode would typically represent one segment or portion of an image to be displayed. A background electrode 105 with lead 116 is positioned adjacent the display electrode 102 and has an aperture 106 formed therein which takes on the same shape as the display electrode 102 but is slightly undersized with respect to the display electrode. The display electrode 102 and the aperture 106 are positioned in registry with one another.

A counterelectrode 112 is spaced from the background electrode 105 and has its own lead 115 connected thereto. The main body of the counterelectrode 112 is positioned in registry with the background electrode 105 and the display electrode 102. A volume of liquid display material 110, by way of example only, a pleochroic liquid crystal thin film, is located in between the counterelectrode 112 and the background electrode 105. The liquid crystal material may be of the type previously mentioned in connection with U.S. Pat. No. 3,833,287. Thus far, the structure of FIG. 3 will be seen to be unique with respect to the prior art of the mentioned U.S. Pat. No. 3,833,287. Specifically, three electrodes are utilized in connection with a single liquid crystal body. Further, complementary shapes are seen to exist when considering the display electrode 102 and the aperture 106 of the background electrode 105.

Figure 4:
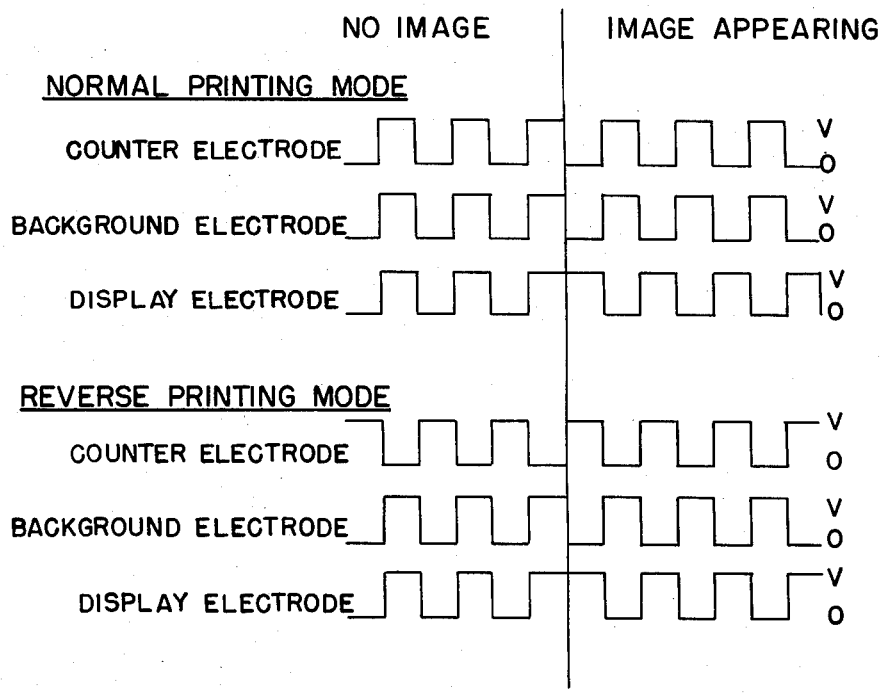
FIG. 4 is a timing diagram illustrating the respective relationships of electrical signals applied to various electrodes of the display shown in FIGS. 3 and 5.

In the event that the same potential is applied to the display electrode 102, background electrode 105, and counterelectrode 112, no electric fields will exist between the various electrodes and if pleochroic material is used at 110, the molecules of the pleochroic material will form the previously discussed helical orientation and virtually all of the unpolarized light will be absorbed by the pleochroic thin film 110. As a result, the entire film will take on a darkened appearance and no image will be displayed. This s indicated in FIG. 4 wherein signals of the same amplitude and phase are applied to the three electrodes illustrated in FIG. 3. This is indicated in FIG. 4 as the "NO IMAGE" of the "NORMAL PRINTING MODE". If the background and display electrodes 102 and 105 have the same signal applied to them while the signal on the counterelectrode 112 is out of phase, this is indicated as the "NO IMAGE" of the "REVERSE PRINTING MODE", which will manifest itself by a lightened thin film 110 due to the electric field that will exist between the counterelectrode and each of the background electrode and display electrode. In this condition, the molecules within the thin film 110 become reoriented to a nonabsorbing state whereby the film 110 becomes light transmissive.

The following discussion pertains to image producing operation of the display. If the same waveform is applied to the counterelectrode 112 and background electrode 105, while a waveform of opposite polarity is applied to the display electrode 102, an electric field is created between the display electrode 102 and the counterelectrode 112 but only across an area defined by the aperture 106. This is indicated by the phantom area 106a in the pleochroic thin film 110. The molecules within the area 106a become reoriented to the nonabsorbing state and this portion of the pleochroic thin film becomes light transmissive.

However, since the electrical signals at the counterelectrode 112 and background electrode 105 are the same, no electric field will exist between these electrodes and as a result the pleochroic liquid crystal molecules in the film 110, outside the phantom area 106a remain helically ordered and absorb unpolarized incident light. As a result, a darkened background defines the display image which is hereinafter referred to as the normal printing mode.

FIG. 4 shows a reverse printing mode. When the signals at the counterelectrode and display electrode are the same, while the signal at the background electrode is out of phase by 180 degrees (opposite polarity), an electric field is made to exist between the display electrode 102 and the background electrode 105 while no electric field will exist between the display electrode 102 and the counterelectrode 112. As a result, the pleochroic molecules within the area 106a, in thin film 110, absorb virtually all of the unpolarized light. Since an electric field will occur between the body of background electrode 105 and the counterelectrode 112, the molecules in the pleochroic film 110, outside the area 106a, become reoriented to a nonabsorbing state. Visually, this will appear as a light or color transmissive background surrounding a darkened or light-absorbing display image in the pleochroic thin film 110.

Figure 5:
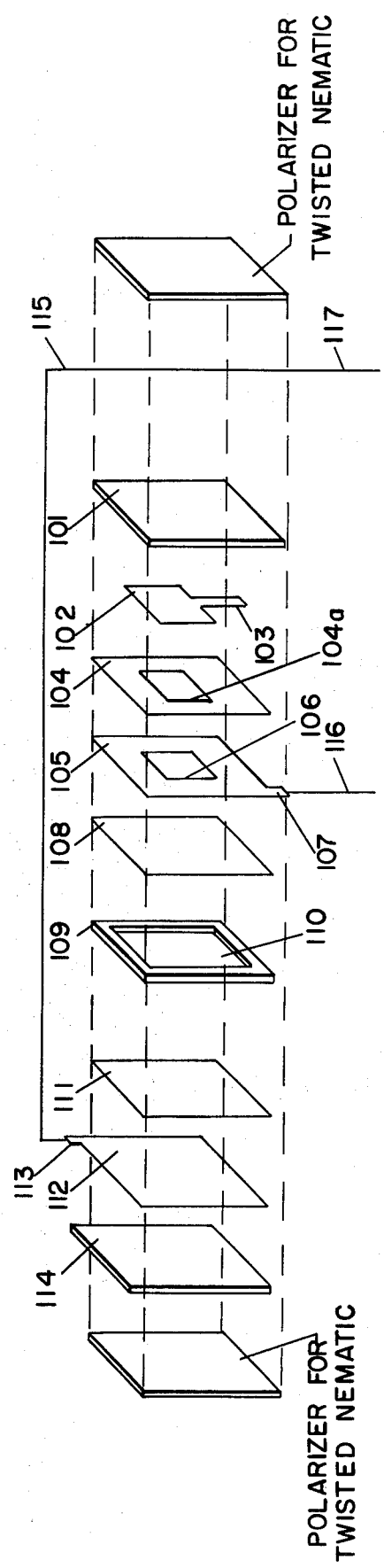
FIG. 5 is a diagrammatic representation of the inventive structure such as shown in FIG. 3 with additional refinements being illustrated.

Referring to FIG. 5, a refinement of the structure shown in FIG. 3 is illustrated. In order to produce a commercial display, a supporting substrate 101, preferably made of glass, must be included. The display electrode 102 is a conductive layer defining a display symbol or segment which is to form an image during operation of the device. The material for electrode 102 may be of a suitable thin film transparent conductive material such as $SnO_2$. The combination of substrate 101 and electrode 102 may be conventionally obtained and is known in the trade as NESA glass. The precise shape of display electrode 102 to form a symbol or segment is effected by conventional etching techniques.

An insulating dielectric layer 104 serving as an insulating spacer is positioned between the display electrode 102 and the background electrode 105, to prevent shorting of these electrodes. Typically, the insulating dielectric layer may be fabricated from $SiO_2$ and by way of example may have a non-critical thickness of 5,000 Angstroms. An aperture 104a is formed in the dielectric layer 104, the aperture being the same shape and size as aperture 106 in electrode 105. The area of the insulating dielectric layer 104 should be sufficiently large to insulate electrical leads connected to the display and background electrodes. An insulator ring 109 may be fabricated from low-melt glass and have a non-critical thickness of about 12 microns. The ring 109 surrounds a thin film 110.

A second conductive layer is the background electrode 105 and has an area generally corresponding to the interior area of the insulator ring 109. Typically, the background electrode 105 may be fabricated from a material such as $In_2O_3$ and may, by way of example, have a non-critical thickness of 2,000 Angstroms.

The counterelectrode 112 and substrate 114 may be of the previously mentioned NESA glass which likewise comprises the substrate 101 and display electrode 102. A molecular aligning layer 108 is interposed between the insulator ring 109 and the background electrode 105. Also, an optional second molecular aligning layer 111 may be interposed between the counterelectrode 112 and the insulator ring 109. These molecular aligning layers are comprised of suitable surfactants as described in the previously mentioned U.S. Pat. No. 3,833,287. They are utilized for achieving initial orientation of the helically ordered film 110.

To this point, emphasis has been placed on the utilization of a pleochroic material as the thin film 110, However, conventional twisted nematic materials, as utilized in conventional LCD digital watches, may be employed if polarizers are disposed outwardly of the multiple electrode structure, as shown in FIG. 5. Further, display materials may be employed as long as they respond to the variations of electric fields placed on a multiple electrode assembly as explained in connection with FIG. 5. Certain of these materials would cause appropriate displays without polarizers while others would require polarizers. It is to be stressed that the invention is not predicated upon the actual material which comprises thin film 110. Rather, it is the multiple electrode structure with differing electric field conditions which achieve a normal printing mode and a reverse printing mode.

Figure 6:
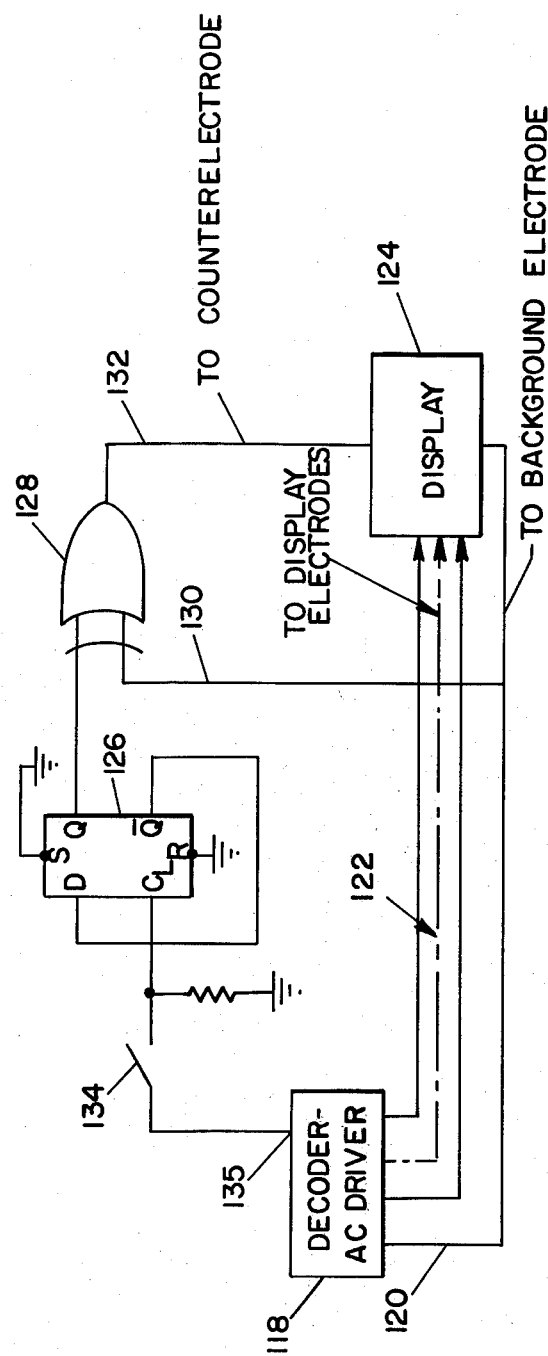
FIG. 6 is a schematic diagram of an A.C. circuit for achieving the reverse printing modes of a display such as illustrated in FIG. 4.

FIG. 6 illustrates a driving circuit for providing the signals necessary to cause the normal printing mode and reverse printing mode as explained in connection with the timing diagrams of FIG. 4. In the example described the circuit is A.C. However, different displays may require D.C. A conventional decoder-A.C. driver 118 is the heart of the circuit and is of the type disclosed in the Intel Data Catalog, copyright 1975, and published by the Intel Corporation of Santa Clara, Calif. (page 8-6 thereof). A single pole, single throw switch 134 is connected between the control terminal 135 of the decoder-A.C. driver 118 and the $C_L$ terminal of the flip-flop 126 for controlling the printing mode. The flip-flop is of the type sold in I.C. form, such as the commercially available CD 4013A chip. The switch 134 may be manually operable to change the printing mode of the display 124. The decoder-A.C. driver 118 has a number of output leads connected to the various display electrodes, as indicated by reference numeral 122. An output lead 120 from the decoder-A.C. driver 118 serves as a common background electrode for the various symbols to be displayed. An exclusive-OR gate 128 is employed to change the squarewave derived from the decoder-A.C. driver 118 to a waveform of opposite polarity or phase reversal, when flip-flop terminal Q is high. It does not change the waveform when terminal Q is low. The output 132 from the exclusive-OR gate is fed to the common counterelectrode of the various symbols for the display. The exclusive-OR gate receives a first input from the terminal Q of flip-flop 126 while a second input 130 is provided by the decoder-driver output 120 which is also connected to the common background electrode. When terminal Q is high by means of an appropriate position of switch 134, the display is in the reverse printing mode. When terminal Q is low, the display functions in the normal printing mode.

From the above discussion of the invention, it will be appreciated that the present display and A.C. drive therefor, provides a means for energizing the background area, i.e., the entire display area except particular symbols or segments. Further, the invention serves as an effective screen to filter out the electric field that exists between leads and a continuous counterelectrode if the background is not used. Further, the invention permits the definition of the exact contour of a symbol and satisfactorily solves the lead showing and dead-zone area problems which are known in the prior art.

Because display electrode and background electrode, which combine to define the symbols, are on the same substrate, alignment is easier. Also, since the counterelectrode is a continuous patternless electrode, exact alignment with the display electrode is obviated. This should provide a higher yield during production of the display.

It should be understood that the invention is not limited to the exact details of construction shown and described herein for obvious modifications will occur to persons skilled in the art.

We claim the following:

1. A display comprising:
   a display electrode having the shape of a symbol to be displayed;
   a layer of display material positioned in spaced aligned relationship to the display electrode;
   a background electrode positioned in interposing aligned relationship between the display electrode and a first side of the display material layer, the background electrode having an aperture therein which has the shape of the symbol to be displayed, the size of the aperture being the same or less than the display electrode;
   a counterelectrode positioned in alignment with the aforementioned components and facing a second side of the display material layer; and
   electrical means respectively connected to the electrodes and the counterelectrode for selectively enabling normal and reversed printed images of the symbol in the display material layer.

2. The subject matter set forth in claim 1 together with driving means connected to the electrodes and counterelectrode for impressing, during a normal printed image mode, a first signal on both the counterelectrode and the background electrode and impressing a second signal of opposite polarity to the first on the display electrode, thus selectively producing an electric field between the display electrode and the counterelectrode, the field transversing the aperture in the background electrode and the display material layer.

3. The subject matter set forth in claim 1 together with driving means connected to the electrodes and counterelectrode for impressing, during a reverse printed image mode, a first signal upon the counterelectrode and display electrode and impressing a second signal of opposite polarity on the background electrode thus selectively producing an electric field between the background electrode and counterelectrode via the display material layer, no electric field traversing the aperture in the background electrode.

4. The subject matter set forth in claim 1 together with driving means connected to the electrodes and counterelectrode for operating the display in a normal printed image mode and a reverse printed image mode;
   the driving means, during a normal printed image mode impressing a first signal on both the counterelectrode and the background electrode and impressing a second signal of opposite polarity to the first on the display electrode, thus selectively producing an electric field between the display electrode and the counterelectrode, the field traversing the aperture in the background electrode and the display material layer;
   the driving means, during a reverse printed image mode impressing a third signal upon the counterelectrode and display electrode and impressing a fourth signal of opposite polarity to the third on the background electrode, thus selectively producing an electric field between the background electrode and counterelectrode via the display material layer, no electric field traversing the aperture in the background electrode.

5. The subject matter set forth in claim 4 together with means for electrically insulating the electrodes and counterelectrode from each other.

6. The subject matter set forth in claim 5 wherein the display material is liquid crystal.

7. The subject matter set forth in claim 6 wherein the display material further contains pleochroic dyes.

* * * * *